(12) United States Patent
Hillyerd et al.

(10) Patent No.: US 11,054,862 B2
(45) Date of Patent: Jul. 6, 2021

(54) UNDOCKING ASSIST MECHANISMS AND METHODS OF USE

(71) Applicant: Microsoft Technology Licensing, LLC, Redmond, WA (US)

(72) Inventors: Anthony E. Hillyerd, Sammamish, WA (US); Scott Douglas Bowers, Woodinville, WA (US); Justin Carl Lind, Issaquah, WA (US); John Stephen Campbell, Spanaway, WA (US); Joseph Benjamin Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 15/139,167

(22) Filed: Apr. 26, 2016

(65) Prior Publication Data

US 2017/0308127 A1 Oct. 26, 2017

(51) Int. Cl.
G06F 1/16 (2006.01)
E05B 65/00 (2006.01)
E05C 19/16 (2006.01)
E05B 47/00 (2006.01)

(52) U.S. Cl.
CPC ........ G06F 1/1656 (2013.01); E05B 65/0067 (2013.01); E05C 19/16 (2013.01); G06F 1/1615 (2013.01); G06F 1/1632 (2013.01); G06F 1/1654 (2013.01); G06F 1/1669 (2013.01); G06F 1/1679 (2013.01); E05B 47/0038 (2013.01)

(58) Field of Classification Search
CPC ..... G06F 1/1654; G06F 1/1656; H01R 13/60; H01R 13/62

USPC .................................................... 361/679.43
See application file for complete search history.

(56) References Cited

U.S. PATENT DOCUMENTS

| 5,997,323 A | 12/1999 | Youn |
| 7,583,500 B2 | 9/2009 | Ligtenberg et al. |
| 8,823,477 B2 | 9/2014 | Malanczyj et al. |
| 8,935,774 B2 | 1/2015 | Belesiu et al. |

(Continued)

FOREIGN PATENT DOCUMENTS

| CN | 102622052 A | 8/2012 |
| CN | 103294123 A | 9/2013 |

(Continued)

OTHER PUBLICATIONS

Linder, Brad, "Acer Aspire Switch 10 2-in-1 Windows tablet review", Published on: Jul. 2, 2014 Available at: http://liliputing.com/2014/07/acer-aspire-switch-10-2-1-windows-tablet-review.html.

(Continued)

*Primary Examiner* — Mukundbhai G Patel
(74) *Attorney, Agent, or Firm* — Ray Quinney & Nebeker P.C.; Paul N. Taylor

(57) ABSTRACT

A computing device is described. The computing device includes a first portion with a protrusion and a second portion separably connected to the first portion. The second portion has a receptacle. An undocking assist mechanism is configured to separate the first portion from the second portion when the protrusion is at least partially inserted into the receptacle. An actuator is configured to actuate the undocking assist mechanism. Methods of use are also described.

21 Claims, 11 Drawing Sheets

(56) References Cited

U.S. PATENT DOCUMENTS

| | | |
|---|---|---|
| 9,195,314 B2 | 11/2015 | Sharma et al. |
| 9,202,615 B2 | 12/2015 | Fullerton et al. |
| 2004/0159762 A1 | 8/2004 | Ghosh |
| 2004/0201601 A1* | 10/2004 | Ke .................... G06F 1/1632 715/700 |
| 2007/0182663 A1 | 8/2007 | Biech |
| 2010/0238620 A1 | 9/2010 | Fish |
| 2012/0243149 A1 | 9/2012 | Gartrell et al. |
| 2013/0257733 A1 | 10/2013 | Moore et al. |
| 2014/0049909 A1 | 2/2014 | Zhu et al. |
| 2014/0049911 A1 | 2/2014 | Corbin et al. |
| 2014/0126126 A1* | 5/2014 | Chuang ............... G06F 1/1626 361/679.01 |
| 2014/0193193 A1 | 7/2014 | Wikander et al. |
| 2014/0211409 A1* | 7/2014 | Wolff .................. G06F 1/1679 361/679.43 |
| 2014/0218855 A1 | 8/2014 | Fujino et al. |
| 2014/0313665 A1 | 10/2014 | Delpier et al. |
| 2015/0116926 A1* | 4/2015 | Robinson ............ G06F 1/1632 361/679.43 |
| 2015/0277491 A1* | 10/2015 | Browning ........... G06F 1/1632 361/679.44 |
| 2016/0037876 A1* | 2/2016 | Perkins ................... A44C 5/14 224/164 |
| 2016/0062411 A1* | 3/2016 | Morrison ............. G06F 1/1632 361/679.08 |

FOREIGN PATENT DOCUMENTS

| | | |
|---|---|---|
| CN | 203504629 U | 3/2014 |
| CN | 103809686 A | 5/2014 |
| TW | I300893 B | 9/2008 |
| WO | 2014184610 A1 | 11/2014 |

OTHER PUBLICATIONS

U.S. Appl. No. 62/237,508, Gault, et al., "Locking Mechanism", filed Oct. 5, 2015.
"International Search Report and Written Opinion Issued in PCT Application No. PCT/US2017/028238", dated Sep. 21, 2017, 11 Pages.
"First Office Action and Search Report Issued in Chinese Patent Application No. 201780025986.X", dated Jan. 25, 2021, 16 Pages.
"Office Action Issued in European Patent Application No. 17734872.9", dated Jan. 29, 2021, 7 Pages.

* cited by examiner

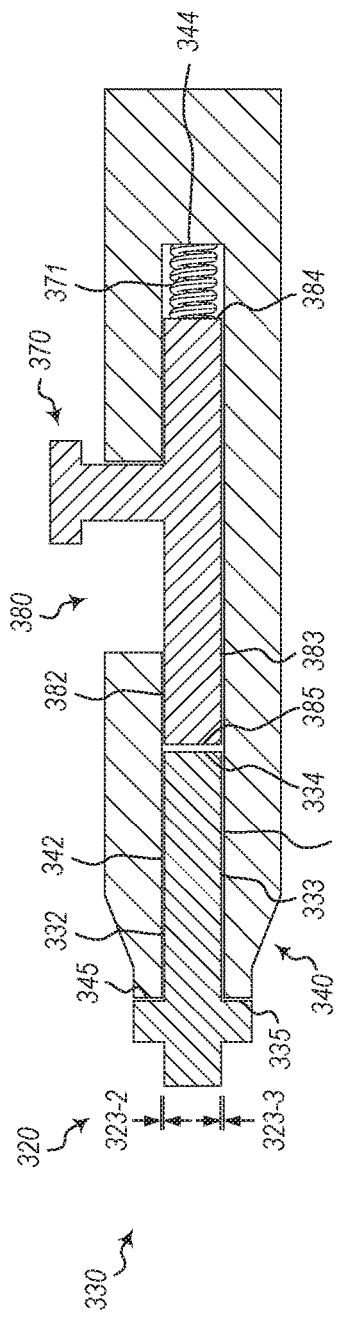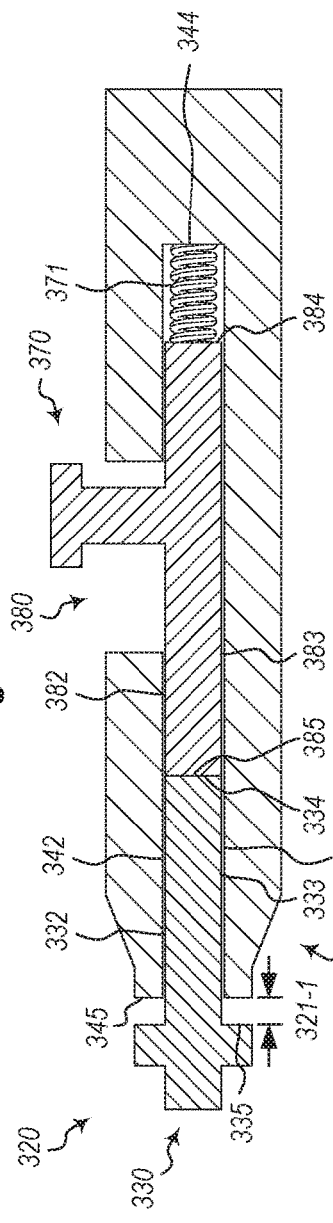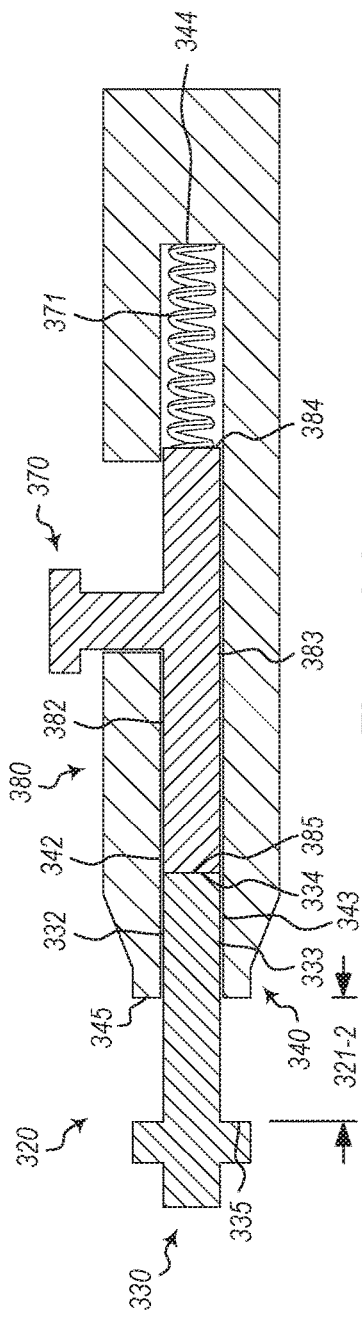

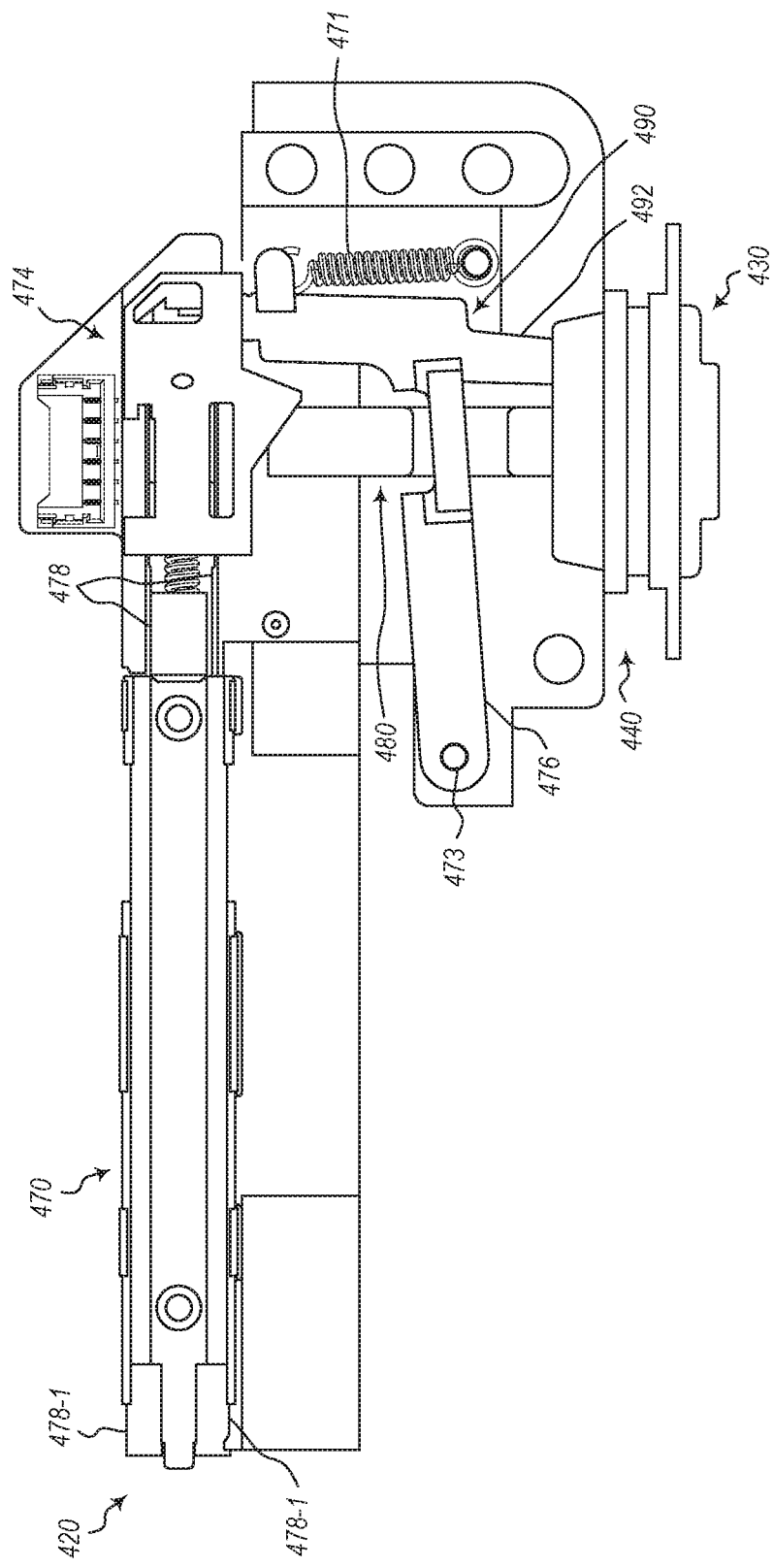

UNDOCKING ASSIST MECHANISMS AND METHODS OF USE

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices that may be separated from the screen.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, a computing device is disclosed. The computing device includes a first portion with a protrusion and a second portion separably connected to the first portion. The second portion has a receptacle. The computing device includes an undocking assist mechanism configured to separate the first portion from the second portion when the protrusion is at least partially inserted into the receptacle. An actuator is configured to actuate the undocking assist mechanism.

In one embodiment, a computing device is disclosed. The computing device includes a first portion and a second portion separably connected to the first portion. A locking mechanism is included that is configured to lock the first portion to the second portion. The locking mechanism includes a locking receptacle connected to the first portion and a locking protrusion connected to the second portion. The locking receptacle and the locking protrusion cooperate to limit movement of the first portion relative to the second portion An actuator is included that is mechanically coupled to the locking mechanism and configured to unlock the first portion from the second portion. An undocking assist mechanism is included that is configured to separate the first portion from the second portion when the locking protrusion is at least partially inserted into the locking receptacle.

In one embodiment, a method for at least partially separating a first portion from a second portion of a computing device is described. The method includes receiving a request to eject the first portion from the second portion. An undocking assist mechanism is actuated to separate the first portion from the second portion. The first portion is separated from the second portion by a distance without applying an external force.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a cutaway side view of an embodiment of a docking mechanism in a docked configuration;

FIG. 3-2 is a cutaway side view of the embodiment of a docking mechanism in FIG. 3-1 in a partially undocked configuration;

FIG. 3-3 is a cutaway side view of the embodiment of a docking mechanism in FIG. 3-1 in an undocked configuration;

FIG. 4-1 is a front view of a docking mechanism in a docked configuration;

FIG. 4-1-1 is a cutaway left side view of a docking mechanism in FIG. 4-1 in the docked configuration;

FIG. 4-2 is a front view of the embodiment of a docking mechanism in FIG. 4-1 in a partially undocked configuration;

FIG. 4-2-1 is a cutaway left side view of a docking mechanism in FIG. 4-1 in the partially undocked configuration;

DETAILED DESCRIPTION

This disclosure generally relates to devices, systems, and methods for undocking two parts that have been docked together. More particularly, this disclosure generally relates to computing devices with two portions that may be docked together and undocked from each other by a docking mechanism and methods of use.

Figure 1:
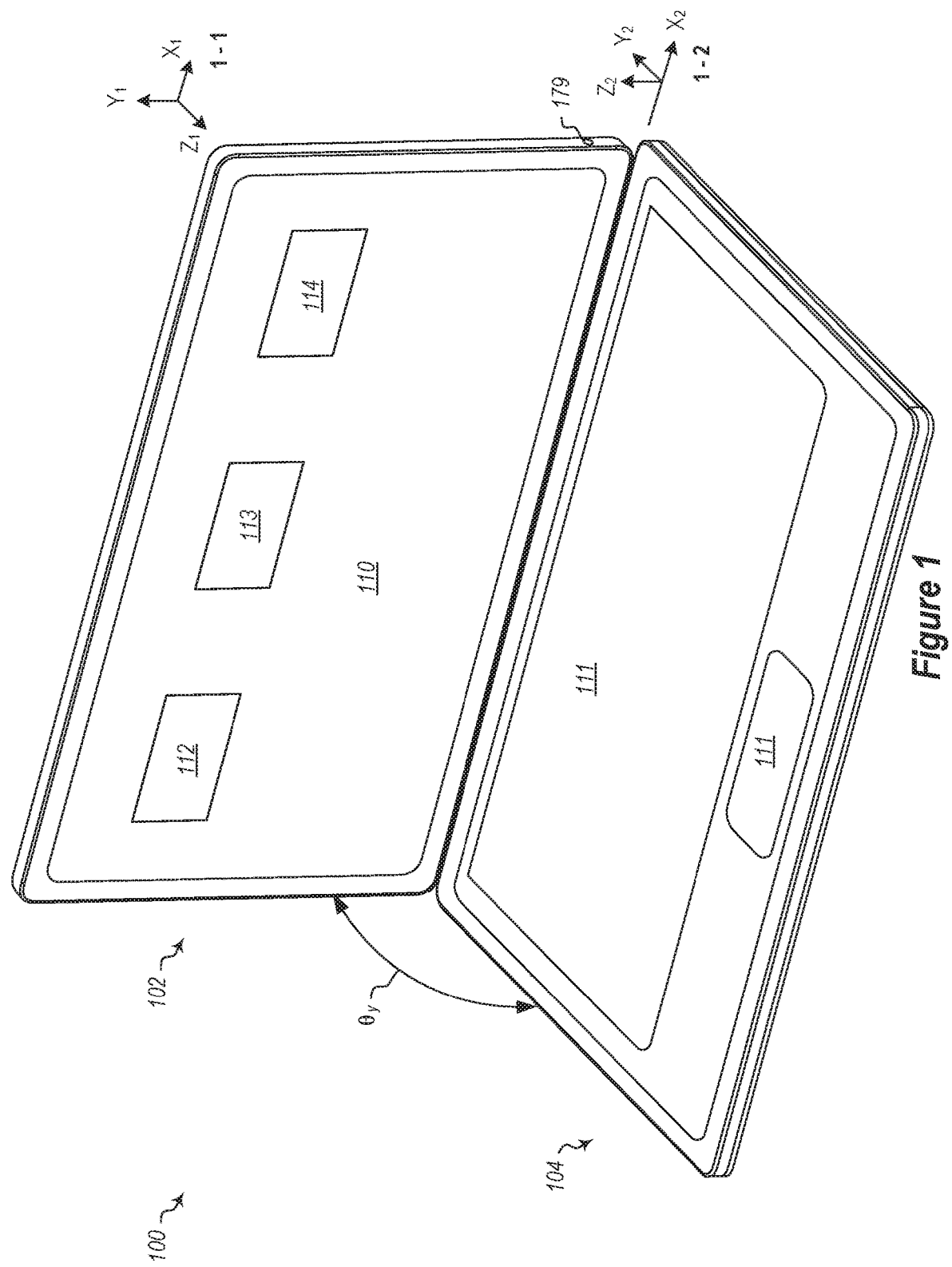
FIG. 1 is an isometric view of an embodiment of a computing device.
Figure 2:
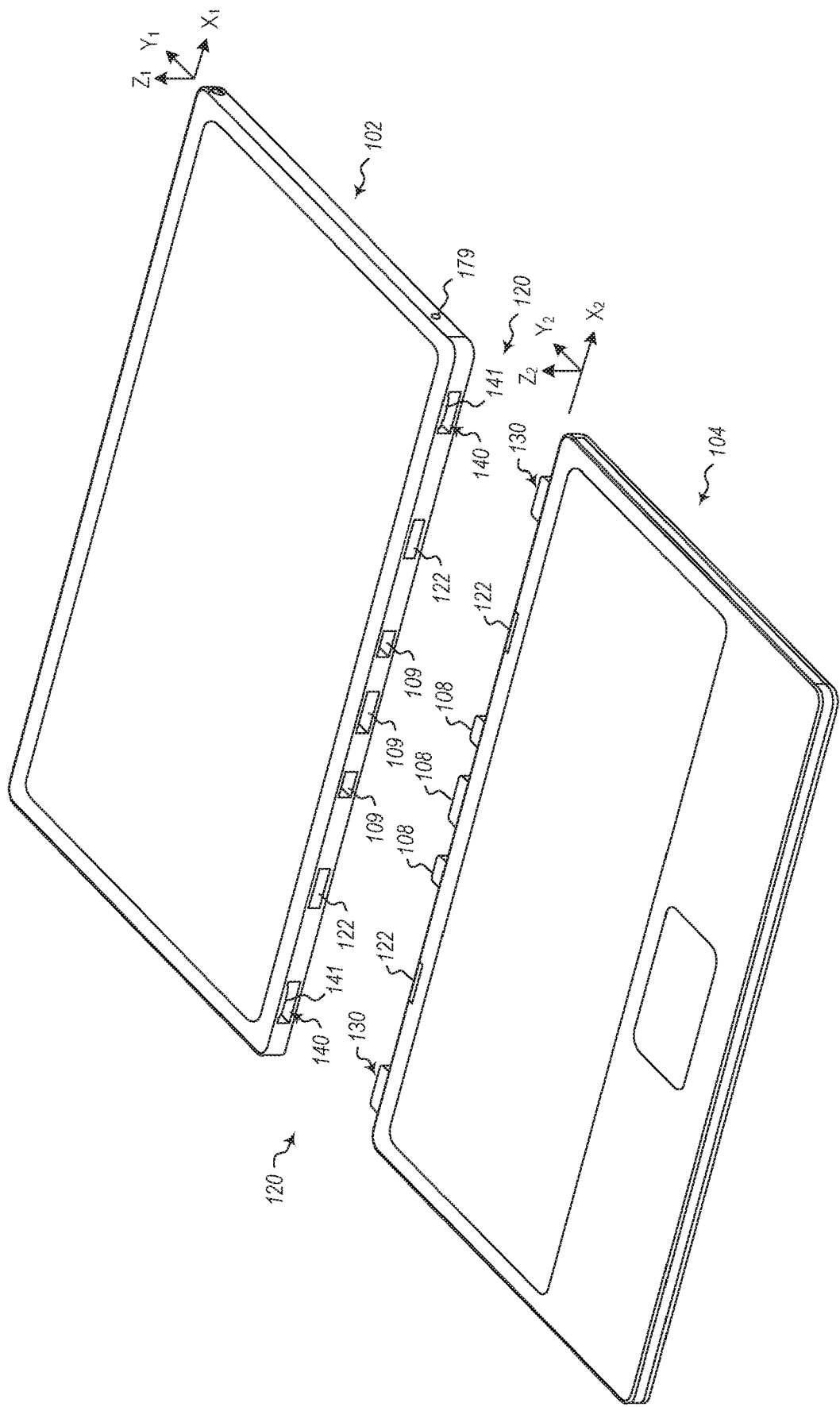
FIG. 2 is an isometric perspective separated view of the embodiment of a computing device in FIG. 1.

FIG. 1 is an isometric view of an embodiment of a computing device 100 and FIG. 2 is an isometric perspective separated view of the embodiment of a computing device 100 in FIG. 1. Referring generally to the computing device 100 shown in FIGS. 1 and 2, the computing device 100 may include a first portion 102 and a second portion 104. The first portion 102 may be separably connected to the second portion 104 by a docking mechanism 120. For example, the first portion 102 may be mechanically connected to the second portion 104 in a docked (and/or locked) configuration, such as the docked configuration shown in FIG. 1. The first portion 102 may transition from the docked configuration to an undocked configuration, such as the undocked configuration shown in FIG. 2. The first portion 102 and the second portion 104 may transition from the connected to the undocked configuration and from the unconnected to the docked configuration.

The docking mechanism 120 may include a locking protrusion 130 and a locking receptacle 140 (shown in FIG. 2). The locking receptacle 140 may include an aperture 141 through which the locking protrusion 130 may be inserted.

By way of orientation, a first coordinate system 1-1 (including the $x_1$-direction, the $y_1$-direction, and the $z_1$-direction) is provided for the first portion 102 and a second coordinate system 1-2 (including the $x_2$-direction, the $y_2$-direction, and the $z_2$-direction) is provided for the second portion 104. In the illustrated configuration, these coordinate systems 1-1, 1-2 are rotated about their respective x-axes. When the angle ($\theta_y$) between the first portion 102 and the second portion 104 is one-hundred and eighty degrees, the $x_1$ and $x_2$ axes are parallel, the $y_1$ and the $y_2$ axes, and the $z_1$ and the $z_2$ axes are parallel. When the angle ($\theta_y$) between the first portion 102 and the second portion 104 is ninety degrees, the $x_1$ and $x_2$ axes are parallel, the $y_1$ and the $z_2$ axes are parallel, and the $z_1$ and the $y_2$ axes are parallel (but opposite (e.g., positive values extending in opposite directions)). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 102 may include a display 110. The display 110 may be a touch sensitive display screen. The second portion 104 may include an input device 111. The input device 111 may include a keyboard, touchpad, one or more buttons, other input devices, or combinations thereof that may be used to provide input to the processor 112. Although a hybrid computing device is shown, the present invention may be used with other computing devices where two portions are separably connected together. For example, the first portion 102 may be a mobile phone and the second portion 104 may be a cover, a keyboard, or other device. In other embodiments, the docking mechanisms described herein may be used in a non-computing (e.g., purely mechanical) environment.

Although FIG. 1 and FIG. 2 illustrate the display 110 of the first portion 102 and the input device 111 of the second portion 104 as facing each other (e.g., both being on the front side of their respective portions), in at least one embodiment described herein, the first portion 102 and second portion 104 may be reversible. For example, the first portion 102 may connect to the second portion 104 as shown (e.g., with the display 110 facing the front) and may be undocked, rotated 180 degrees, and docked to the second portion 104 such that the first portion 102 faces the opposite direction (e.g., with the display 110 facing the back). Thus, the docking mechanism 120 may be configured to allow a reversible connection between the first portion 102 and the second portion 104.

The first portion 102 and/or the second portion 104 may include a processor 112, memory 113, a battery 114, other computing components, or combinations thereof. For example, as shown, the first portion 102 may include a processor 112, memory 113, and a battery 114 while the second portion 104 may also include a processor 112. In some embodiments, only one of the first portion 102 or the second portion 104 may include a processor 112. In other embodiments, both of the first portion 102 and the second portion 104 include a processor 112. In further embodiments, one or more computing components (e.g., processors 112, memory 113, and battery 114) may be included in the first portion 102 and/or the second portion 104 in any combination.

The computing components in the second portion 104 may be in electronic communication with one or more of the computing components in the first portion 102. For example, as shown in FIG. 2, the first portion 102 and the second portion 104 may be in electronic communication via a physical electrical connector that includes an electrical protrusion 108 and an electrical receptacle 109. Further examples of physical electrical connectors may be found in co-pending U.S. patent application Ser. No. 14/956,118, the entirety of which is hereby incorporated by reference.

As shown in FIG. 2, one or more electrical protrusions 108 are located on the second portion 104 and one or more electrical receptacles 109 are located on the first portion 102. In other embodiments, one or more electrical receptacles 109 are located on the second portion 104 and one or more electrical protrusions 108 are located on the first portion 102. In further embodiments, the first portion 102 and the second portion 104 may include one or more electrical receptacles 109 and one or more electrical protrusions 108, such that each of the first portion 102 and second portion 104 may include a combination of electrical receptacles 109 and electrical protrusions 108.

The electrical protrusions 108 and/or electrical receptacles 109 may include various electrical connections. As shown, the electrical protrusions 108 and electrical receptacles 109 include multiple pin connectors. In embodiments where computing components (e.g., the processor 112, memory 113, or battery 114) are on separate portions (e.g., first portion 102 and second portion 104), maintaining electrical communication between the first portion 102 and the second portion 104 may be important. For example, if a computing component on the second portion 104 were to lose electrical communication with an electrical component on the first portion 102, the computing device 100 may fail (e.g., an operating system may crash or a computing component may be affected by a power surge when the electrical connection is restored). Some electrical connections may be sensitive (e.g., high speed). Thus, in some embodiments, it may be desirable for the first portion 102 and the second portion 104 to be securely connected together in the docked configuration by a docking mechanism 120. The docking mechanism 120 may include a locking protrusion 130 and a locking receptacle 140 and may include a magnet 122, which will be described in more detail below. Furthermore, in some embodiments, it may be desirable for a computing component (e.g., the processor 112, memory 113, or battery 114) in the second portion 104 to hand off its responsibilities to a computing component (e.g., the processor 112, memory 113, or battery 114) on the first portion 102 (or vice versa) before undocking from the first portion 102.

The computing device 100 may include one or more docking mechanisms 120. As illustrated in FIG. 2, the computing mechanism includes two docking mechanisms 120. In other embodiments, more or fewer docking mechanisms 120 may be used. For example, a single docking mechanism 120 may be used. The single docking mechanism 120 may incorporate both a single locking protrusion 130 and one or more components of one or more electrical protrusions 108 into the single docking mechanism 120 to be inserted into a single locking receptacle 140 that includes one or more components of one or more electrical receptacles 109 (e.g., the single docking mechanism 520 with a single locking protrusion 530 and a single locking receptacle 540 shown in FIG. 5).

The one or more docking mechanisms 120, as illustrated, may include one or more locking receptacles 140 on the first portion 102 and one or more locking protrusions 130 on the second portion 104. In other embodiments, the first portion 102 and the second portion 104 may each include one or more locking protrusions 130 and corresponding one or more locking receptacles 140. In other words, the first portion 102 may include a first locking protrusion 130, a second locking receptacle 140, and a third locking protrusion 130 and the second portion 104 may include a first locking receptacle 140 corresponding to the first locking protrusion 130 on the first portion 102, a second locking protrusion 130 corresponding to the second locking receptacle 140 on the first portion, and a third locking receptacle 140 corresponding to the third locking protrusion 130 on the first portion. More and or fewer combinations of docking mechanisms 120 in either configuration (e.g., only locking protrusions 130 or locking receptacles 140 on each portion or combinations of locking protrusions 130 or locking receptacles 140 on each portion) may be used.

As described above, in some embodiments, the one or more docking mechanisms 120 may include one or more magnets 122. As shown, in FIG. 2 each docking mechanism 120 may include one or more magnets 122. In other embodiments, one magnet 122 may be used for more than one docking mechanism 120 and/or more than one magnet 122 may be used for each docking mechanism 120.

The locking protrusions 130, in the illustrated embodiment, may include a planar upper surface and a planar lower surface. The locking protrusions 130 may have edges that are rounded, chamfered, otherwise shaped, or combinations thereof.

The apertures 141 of the locking receptacles 140 on the first portion 102 are shown as being rounded on their front (e.g., in the z-direction) edges. In other embodiments, the apertures 141 of the locking receptacles may be rounded on their bottom (e.g., in the negative z-direction) edges. In further embodiments, the aperture 141 locking receptacle 140 may have an elongate rectangular shape. However, in embodiments where the locking receptacle 140 has an elongate rectangular shape, the locking protrusion 130 may be more likely to become bound within the locking receptacle 140. For example, when a locking protrusion 130 does not have much space within its corresponding locking receptacle 140, any twist about the y- or x-axis may bind the locking protrusion 130 in the locking receptacle 140. In order to prevent binding, a user would need to pull toward the bottom without significant rotation. In other words, to prevent binding, a user would need to pull parallel to a longitudinal axis (e.g., the y-axis) of the locking protrusion(s) 130. However, by providing a few degrees of twist about the y-axis, a user may have some rotation without binding the locking protrusion 130 within the locking receptacle 140. In embodiments where the convex surface is opposite the rotating lock (e.g., rotating lock 360), line contact with the rotating lock and the convex surface may be achieved.

In addition or in the alternative, an undocking assist mechanism may be used to facilitate the separation of the first portion 102 and the second portion 104. Embodiments of undocking assist mechanisms will be provided below. An eject button 179 may be used to activate one or more features of the computing device 100. When a user presses the eject button 179, the docking mechanism 120 may be activated to separate the first portion 102 from the second portion 104. For example, when a user presses the eject button 179, the locking protrusion 130 may unlock from the locking receptacle 140 and/or the undocking assist mechanism may push the locking protrusion 130 at least partially out of the locking receptacle.

FIG. 3-1 is a cutaway side view of an embodiment of a docking mechanism 320 in a docked configuration. FIG. 3-2 is a cutaway side view of the embodiment of a docking mechanism 320 in FIG. 3-1 in a partially undocked configuration. FIG. 3-3 is a cutaway side view of the embodiment of a docking mechanism 320 in FIG. 3-1 in a ready to be undocked configuration. Referring generally to FIGS. 3-1, 3-2, and 3-3, the docking mechanism 320 may be used instead of or in addition to any docking mechanism described herein. The docking mechanism 320 may include a protrusion 330 and a receptacle 340. The protrusion 330 may be connected (e.g., directly, integrally, or otherwise connected) to a first portion (e.g., first portion 102) and the receptacle 340 may be connected to a second portion (e.g., second portion 104). In other embodiments, the protrusion 330 may be connected to a second portion and the receptacle 340 may be connected to a first portion.

The protrusion 330 may be elongate in at least one direction. In other words, the protrusion 330 may have a longer dimension in one direction than another. The length of the protrusion 330 from the bottom surface 335 to the top surface 334 may be between 2 mm and 12 mm. In one embodiment, the length of the protrusion 330 may be between 4 mm and 12 mm. In another embodiment, the length of the protrusion 330 may be between 6 mm and 12 mm. The receptacle 340 may be at least as deep (from the bottom surface 345 to the top surface 344) as the protrusion 330 is long.

The protrusion 330 may include a front surface 332, a back surface 333, and a top surface 334. The receptacle 340 may include a front surface 342, a back surface 343, a top surface 344, and a bottom surface 345. The receptacle 340 may be sized and/or configured to receive the protrusion 330. For example, the receptacle 340 may be sized so that the entire front surface 342 and back surface 343 may fit within the receptacle 340.

The front surface 342 of the receptacle 340 may be sized and oriented to abut the front surface 332 of the protrusion 330. The back surface 343 of the receptacle 340 may be sized and oriented to abut the back surface 333 of the protrusion 330. As shown in FIG. 3-1, the bottom surface 335 of the protrusion 330 may engage and/or abut the bottom surface 345 of the receptacle 340 when fully inserted.

As shown, the front surface 332, back surface 333, top surface 334, and bottom surface 335 of the protrusion 330 are flat and abut side surfaces (not shown) at their respective edges. The front surface 342, back surface 343, top surface 344, and bottom surface 345 of the receptacle 340 may be flat and may abut side surfaces (not shown) at their respective edges. In other embodiments, one or more surfaces may be otherwise shaped. For example, at least a portion of one or more surfaces may be concave and/or convex. One or more surfaces of the protrusion 330 may be shaped similarly to one or more corresponding surfaces of the receptacle 340. In other embodiments, one or more surfaces of the protrusion 330 may be shaped differently from one or more corresponding surfaces of the receptacle 340. Further examples of protrusions and/or receptacles may be found in co-pending U.S. patent application Ser. No. 14/956,118, filed on Dec. 1, 2015, the entirety of which is hereby incorporated by reference.

The docking mechanism 320 may include an undocking assist mechanism 380. The undocking assist mechanism 380 may be configured to assist in the removal of the protrusion 330 from the receptacle 340.

As described above, when a protrusion 330 does not have much space within its corresponding receptacle 340, any twist about the y- or x-axis may bind the protrusion 330 in the receptacle 340. In order to prevent binding, a user would need to pull toward the bottom (e.g., in a direction parallel to a longitudinal axis of the protrusion 330) without significant rotation. In embodiments with an undocking assist mechanism, the undocking assist mechanism may apply an undocking force to the protrusion 330 in a direction parallel or substantially parallel to its removal. This may reduce the likelihood of binding between the protrusion 330 and the receptacle 340, in at least one embodiment.

The front surface 342 of the receptacle 340 may abut a front surface 382 of the undocking assist mechanism 380 and/or the back surface 343 of the receptacle may abut a back surface 383 of the undocking assist mechanism 380. Thus, the undocking assist mechanism 380 may slide within the receptacle 340. The top surface 334 of the protrusion 330 may abut a bottom surface 385 of the undocking assist mechanism 380 in the docked configuration. Thus, movement of the undocking assist mechanism 380 may move the protrusion 330.

The undocking assist mechanism 380 may include an actuator 370. The actuator 370 is shown as a handle that may be mechanically actuated by a user to assist in the undocking of the protrusion 330 from the receptacle 340. The actuator 370 may extend from the front surface 382 of the undocking assist mechanism 380. As shown in FIG. 3-1, the undocking assist mechanism 380 is in a docked configuration. In other words, the protrusion 330 may be fully inserted into the receptacle 340. The undocking assist mechanism 380 may be biased toward the docked configuration. For example, the docking mechanism 320 may include a biasing mechanism (e.g., spring 371) that biases the undocking assist mechanism 380 toward the docked configuration. The spring 371 may attach to a top surface 384 of the undocking assist mechanism 380.

The actuator 370 may apply an undocking force to the protrusion 330. For example, as shown in FIG. 3-2, the undocking force may separate the bottom surface 335 of the protrusion 330 from the bottom surface 345 of the receptacle 340 by a first distance 321-1. The undocking force may be sufficient to overcome the biasing force applied by the spring 371, friction between the front surfaces 332, 342, the back surfaces 333, 343, side surfaces (not shown) of the protrusion 330 and the receptacle 340, respectively, or combinations thereof, magnetic forces (e.g., in embodiments with one or more magnets), or combinations thereof.

Although the first distance 321-1 is small relative to the overall length of the protrusion 330, any distance between the bottom surfaces 335, 345 of the protrusion 330 and receptacle 340 decreases the likelihood of the protrusion 330 binding within the receptacle 340. For example, for a protrusion length of 6 mm (e.g., from the top surface 334 to the bottom surface 335), if the first distance 321-1 between the bottom surfaces 335, 345 of the protrusion 330 and receptacle 340 were 1 mm, the angles (e.g., $\theta_x$, $\theta_y$, $\theta_z$) at which the undocking force may be applied to the protrusion 330 without binding may increase. As shown in FIG. 3-3, the bottom surfaces 335, 345 of the protrusion 330 and receptacle 340 may be separated by a second distance 321-2. The second distance 321-2 may be, for example, 4 mm. The angles at which the undocking force may be applied to the protrusion 330 without binding may be higher for the second distance 321-2 than for the first distance 321-1. Although the second distance 321-2 is shown as being shorter than the length of the protrusion 330, in other embodiments, the undocking assist mechanism 380 may be long enough to completely eject the protrusion 330 (e.g., the second distance 321-2 may be greater than or equal to a length of the protrusion 330).

Separating the protrusion 330 from the receptacle 340 by even a small distance may provide an indication to the user that the docking mechanism 320 is ready for further separation. In other words, when a user sees that the docking mechanism 320 has transitioned from the docked configuration toward the undocked configuration, a user may then separate the protrusion 330 (and thus one portion) from the receptacle 340 (and thus the other portion). In some embodiments, the first distance 321-1 may be small enough that the protrusion 330 remains docked within the receptacle 340 such that a first portion connected to the protrusion 330 and a second portion connected to the receptacle 340 may remain in electrical connection with each other and/or may remain sufficiently connected to only disconnect with additional externally applied force.

In embodiments where magnets are used to keep the protrusion 330 within the receptacle 340, the undocking force may be sufficient to move the protrusion 330 at least partially out from the receptacle 340, although the forces applied by the magnets may still act on the protrusion 330. For instance, if the magnetic force were 16 Newtons when the protrusion 330 is fully inserted into the receptacle 340 when the bottom surface 335 of the protrusion 330 is 1 mm away from the bottom surface 345 of the receptacle 340 the magnetic force may be, for example, 8 Newtons. Thus, the magnetic force may still affect the protrusion 330. In another example, the magnetic force may decrease exponentially as the distance between the bottom surfaces 335, 345 of the protrusion 330 and the receptacle 340 increases.

As shown in FIGS. 3-1, 3-2, and 3-3, the front surface 332 of the protrusion 330 and the front surface 342 of the receptacle 340 and/or the back surface 333 of the protrusion 330 and the back surface 343 of the receptacle 340 may be parallel. The receptacle 340 may include a gap 323-2 between the front surface 332 of the protrusion 330 and the front surface 342 of the protrusion, a gap 323-3 between the back surface 333 of the protrusion 330 and the back surface 343 of the protrusion, a gap (not shown) between one or more side surfaces (not shown) of the protrusion 330 and one or more corresponding side surfaces (not shown) of the receptacle 340, or combinations thereof. The gaps may range from 0.05 mm to 0.6 mm. For example, the gaps may be less than 0.5 mm. In another example, the gaps may be a percentage of an overall dimension. In other words, for a dimension between the front surface 332 and the back surface 333, the gaps 323-2, 323-3 may be between 5 and 20%. In some embodiments, no gap may exist between the surfaces of the receptacle 340 and the protrusion 330. For example, when a locking mechanism (e.g., locking mechanism 490) is used and the protrusion 330 is locked in the receptacle 340, the gap between at least two surfaces may be zero.

In the embodiment of a docking mechanism 320 shown in FIGS. 3-1, 3-2, and 3-3, the protrusion 330 is not mechanically locked in the docked configuration of FIG. 3-1. Rather, the receptacle 340 is shown as being held to the protrusion 330 by an external force, such as, gravity and/or magnetic forces. In other embodiments, the protrusion 330 may be locked in the receptacle 340 by mechanical means.

Figures 1, 4:
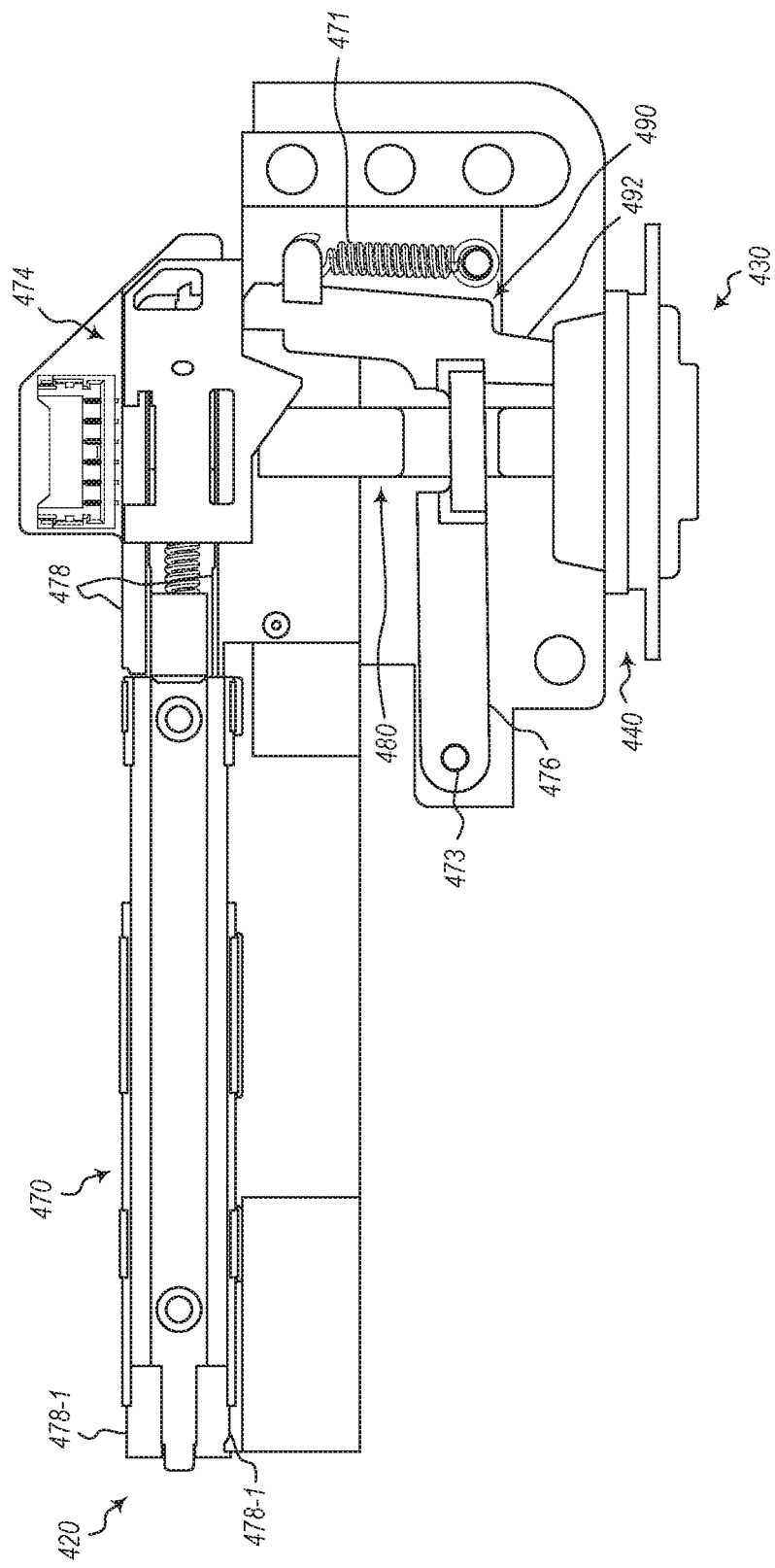
Figures 1, 4:
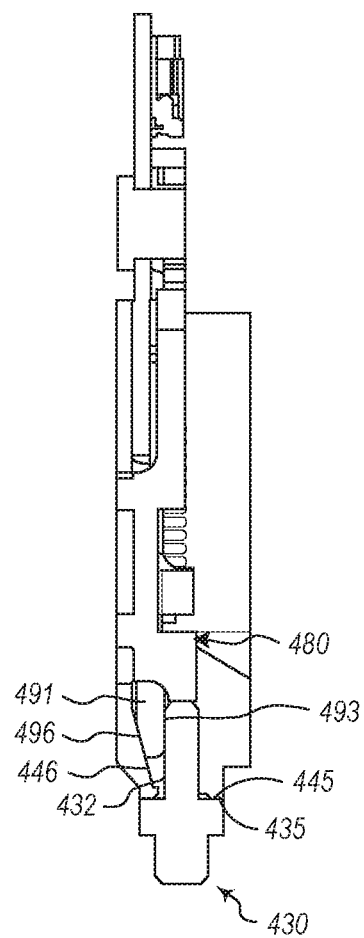
Figures 1, 2, 4:
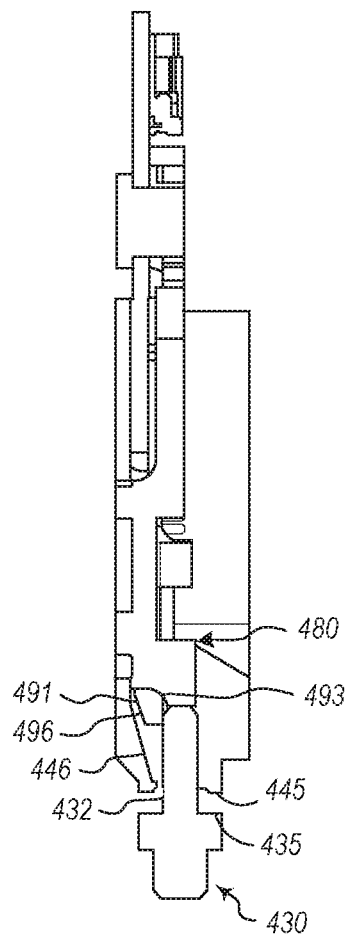

FIG. 4-1 is a front view of a docking mechanism 420 in a docked configuration. FIG. 4-2 is a front view of the embodiment of a docking mechanism 420 in FIG. 4-1 in a partially undocked configuration. Referring generally to FIGS. 4-1 and 4-2, the docking mechanism 420 may be used instead of or in addition to any docking mechanism described herein. The docking mechanism 420 may include a locking protrusion 430 and a locking receptacle 440. The locking protrusion 430 and locking receptacle 440 may be similar to the protrusion 330 and receptacle 340 described above. The locking protrusion 430 may be connected (e.g., directly, integrally, or otherwise connected) to a first portion (e.g., first portion 102) and the locking receptacle 440 may be connected to a second portion (e.g., second portion 104). In other embodiments, the locking protrusion 430 may be connected to a second portion and the locking receptacle 440 may be connected to a first portion.

The docking mechanism 420 of FIGS. 4-1 and 4-2 may include both an undocking assist mechanism 480 and a locking mechanism 490. The locking mechanism 490 may lock the locking protrusion 430 in the locking receptacle 440 in the docked configuration. In other words, the locking mechanism 490 may physically lock (e.g., via a wedge, cam, latch, locking roller, or other locking feature) the locking protrusion 430 in the locking receptacle 440, such that a bottom surface 435 of the locking protrusion 430 abuts a bottom surface 445 of the locking receptacle 440 (as best seen in FIG. 4-1-1). Further examples of locking mechanisms may be found in co-pending U.S. patent application Ser. No. 14/956,118, filed on Dec. 1, 2015, the entirety of which is hereby incorporated by reference.

The locking mechanism 490 of FIGS. 4-1 and 4-2 is shown with a wedge 491 locking mechanism. FIG. 4-1-1 is a cutaway left side view of the docking mechanism 420. As shown in FIG. 4-1-1, the locking receptacle 440 includes a tapered surface 446. The tapered surface 446 may interact with a tapered surface 496 on the wedge 491. As shown in FIG. 4-1-1, the tapered surface 496 of the wedge 491 of the locking mechanism 490 may abut the tapered surface 446 of the locking receptacle 440 such that a front surface 492 of the wedge 491 abuts a back surface 433 of the locking protrusion 430, thus locking the locking protrusion 430 in place. In some embodiments, locking mechanism 490 may be sufficient to resist 100 Newtons of undocking force. As shown in FIG. 4-2-1, when the locking mechanism 490 is retracted, the tapered surfaces 446, 496 of the locking receptacle 440 and locking mechanism 490 disengage.

An actuator 470 may be used to unlock the locking mechanism 490 and free the locking protrusion 430. As shown in FIGS. 4-1 and 4-2, the actuator 470 may include a shape memory alloy (SMA) wire 478. In some embodiments, such as the illustrated embodiment, the locking mechanism 420 may include a single wire 478 that has a single loop. In other embodiments, multiple wires 478 and/or multiple loops may be used. Although shown with an electronic actuator 470, the actuator 470 may use other actuation inputs, such as a mechanical slide, a latch, other actuation inputs, or combinations thereof.

As shown in FIG. 4-1, the actuator 470 may include a lever arm 476 that may be directly connected to the locking mechanism 490. For example, the locking mechanism 490 may be integrally formed with the lever arm 476. The lever arm 476 (and the locking mechanism 490) may rotate about a pin 473 (shown on the left of FIG. 4-1).

The lever arm 476 may be connected to the actuator 470 by a connector 474. A first end of the SMA wire 478 may be connected by a clip 478-1 to the docking mechanism 420 and a second end of the SMA wire 478 may be connected to the connector 474. The clip 478-1 may be configured to receive current from a power source (e.g., battery 114) to heat the SMA wire 478. The SMA wire 478 may transition between a locked state (shown in FIG. 4-1) and an unlocked state (shown in FIG. 4-2). As shown, the SMA wire 478 is fully extended in the locked state and is fully retracted in the unlocked state.

The SMA wire 478 may be in a martensite state in the undocked and locked configurations and in an austenite state in the unlocked configuration. When the SMA wire 478 is heated above its transition temperature (e.g., above 90° C. for nickel-titanium), the SMA wire 478 may transition to the austenite state causing a decrease in length (by about 3% for nickel-titanium). For example, for a single wire 478 connected at one end to the locking mechanism 420 and at the other end to the connector 474, the SMA wire 478 may decrease in length (i.e., pull the first end of the SMA wire 478 toward the second end of the SMA wire 478). For a nickel-titanium SMA wire, the decrease in length, and thus, corresponding movement of the connector 474 is 4.5 mm (for a single wire) and 2.25 mm (for a looped wire). When the SMA wire 478 drops below its transition temperature, the SMA wire 478 may transition back to the martensite state returning to its original length (or substantially to its original length). For a nickel-titanium SMA wire the wire increases in length by 4.5 mm (for a single wire) and 2.25 mm (for a looped wire).

The connector 474 may include a pulley (not shown) about which the SMA wire 478 may be wrapped. For example, two clips 478-1 may be secured to each end of the single SMA wire 478 and a portion of the wire (e.g., the middle) may be wrapped around the connector 474. When the SMA wire 478 is heated above its transition temperature, the SMA wire 478 may transition to the austenite state causing a decrease in length (by about 3% for nickel-titanium), but as the wire is wrapped around the connector 474, the distance between the two ends of the SMA wire 478 and the connector 474 is decreased by double the distance of an SMA wire that is connected at one end to the locking mechanism 420 and at the other end to the connector 474. Likewise, when the SMA wire 478 drops below its transition temperature, the SMA wire 478 may transition back to the martensite state returning to its original length (or substantially to its original length), thus effectively moving twice the distance back to its original length compared to a non-wrapped SMA wire 478.

The locking mechanism 490 may include a biasing mechanism (e.g., one or more springs 471). The locking mechanism 490 may be biased toward the bottom of the docking mechanism 420 (e.g., toward the locking receptacle 440) and/or toward the opposite end(s) (e.g., the end away from the connector 474) of the SMA wire 478. Thus, when the SMA wire 478 cools below its transition temperature, the biasing mechanism guides the connector 474 back toward its original position (e.g., from the left toward the right).

In some embodiments, biasing the locking mechanism 490 toward the bottom of the docking mechanism 420 and toward the opposite end(s) of the SMA wire 478 may be accomplished by a single biasing mechanism (e.g., with a single spring 471, as illustrated). In other embodiments, biasing may be accomplished by one or more biasing mechanisms.

As the docking mechanism 420 moves from the locked configuration of FIG. 4-1 to the unlocked configuration of FIG. 4-2, the locking protrusion 430 may be retracted from the locking receptacle 440. The locking mechanism 490 may move toward the top of the docking mechanism 420. For example, the locking mechanism 490 may move the wedge 491 toward the top of the docking mechanism 420, thus moving the wedge 491 toward the top. The lever arm 476 may rotate upward (e.g., toward the top of the locking mechanism 420) about its pin 473.

As the locking mechanism 420 moves from the locked configuration of FIG. 4-1 to the unlocked configuration of FIG. 4-2, the SMA wire 478 may be heated above its transition temperature (e.g., above 90° C.) to reduce the length of the SMA wire 478 and pull the connector 474 toward the opposite end of the SMA wire 478. The force applied to the connector 474 causes the lever arm 476 to rotate toward the connector 474. Rotation of the lever arm 476 causes the locking mechanism 490 to retract from the locking receptacle 440, thereby unlocking the locking protrusion 430. The locking mechanism 420 may remain in the unlocked configuration as long as the SMA wire 478 is heated above its transition temperature. When the SMA wire 478 cools below the transition temperature, the SMA wire 478 begins to elongate and the biasing mechanism moves the locking mechanism 490 toward the locking receptacle 440.

In some embodiments, the temperature of the SMA wire 478 may be controlled by a processor (e.g., processor 112). For example, no power may be applied to the SMA wire 478 until the processor receives an instruction to apply power to the SMA wire 478. An instruction to apply power may be given based on a user interacting with an input device (e.g., input device 111).

As shown in FIGS. 4-1 and 4-2, the undocking assist mechanism 480 may also be actuated by the actuator 470. In other embodiments, the undocking assist mechanism 480 may be actuated separately from the locking mechanism 490. As shown in FIG. 4-1, the undocking assist mechanism 480 may abut the locking protrusion 430 in the locked/docked configuration. The undocking assist mechanism 480 may be coupled to the connector 474. For example, as shown, the connector 474 and the undocking assist mechanism 480 may each include inclined surfaces that abut each other. As the SMA wire 478 transitions from the locked state toward the unlocked state, the connector 474 moves from right to left. As the connector 474 moves to the left, the inclined surface of the connector moves to the left. As the inclined surface of the connector 474 moves to the left, it applies a force to the inclined surface of the undocking assist mechanism 480 which moves the undocking assist mechanism into the locking receptacle 440. As shown in FIG. 4-2, the undocking assist mechanism 480 pushes the locking protrusion 430 at least partially out of the locking receptacle.

The angle of the inclined surfaces may be determined based on a desired distance of travel for the undocking assist mechanism 480 and/or an amount of work that the SMA wire 478 is capable of accomplishing. For example, for a given mass, length, and diameter of the SMA wire 478, the SMA wire 478 is capable of performing a predetermined amount of work. The predetermined amount of work may be applied to the locking mechanism 490 (including any biasing mechanisms) and/or the undocking assist mechanism 480. If magnets or other features are used to retain the locking protrusion 430 in the locking receptacle 440, these forces would also reduce the available workload that the SMA wire 478 is capable of performing. For example, if the angle of the inclined surfaces of the connector 474 and the undocking assist mechanism 480 with respect to the longitudinal axis of the SMA wire 478 is large (e.g., greater than 45 degrees), then a greater amount of work would be required by the SMA wire 478. The angle shown is 35 degrees.

The undocking assist mechanism 480 may at least partially push the locking protrusion 430 out of the locking receptacle 440. As shown in FIG. 4-2-1, the locking mechanism 490 is at least partially retracted from the locking receptacle 440. In other embodiments, the locking mechanism 490 may remain engaged with the locking protrusion 430 while the undocking assist mechanism 490 pushes the locking protrusion 430 out of the locking receptacle 440. In this example, the force required to push the locking protrusion 430 out of the locking receptacle 440 would be higher than in embodiments where the locking mechanism 490 is disengaged before and/or during the ejection of the locking protrusion 430.

Figure 5:
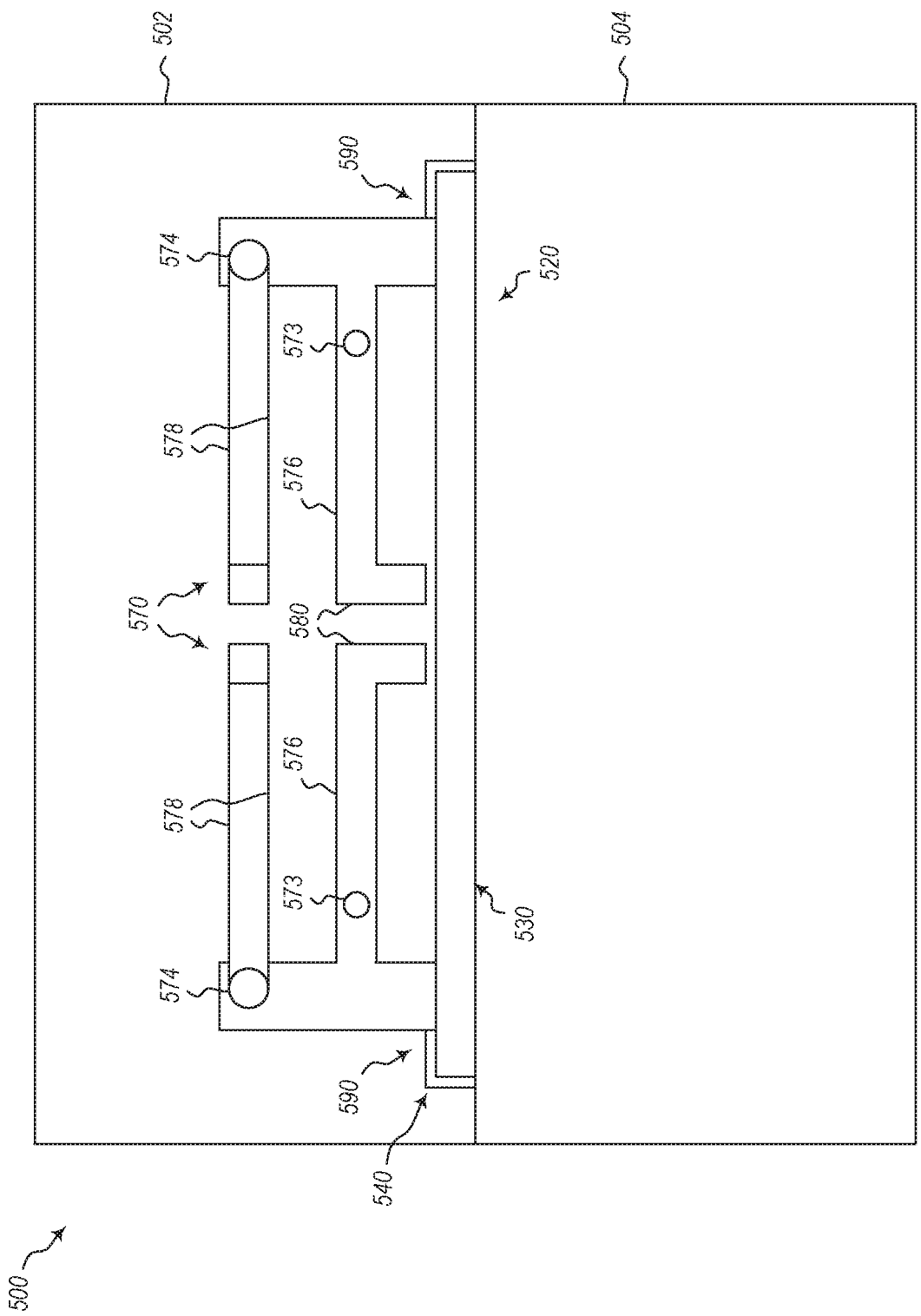
FIG. 5 is a top cutaway view of an embodiment of a computing device.

FIG. 5 is a top cutaway view of an embodiment of a computing device 500. The computing device 500 may include a first portion 502 and a second portion 504. The first portion 502 may be separably connected to the second portion 504 by a docking mechanism 520. For example, the first portion 502 may be mechanically connected to the second portion 504 in a docked (and/or locked) configuration, such as the docked configuration shown in FIG. 5. The first portion 502 may transition from the docked configuration to an undocked configuration. The first portion 502 and the second portion 504 may transition from the docked to the undocked configuration and from the unconnected to the docked configuration.

The docking mechanism 520 may include a locking protrusion 530 and a locking receptacle 540. The locking protrusion 530 shown in FIG. 5 is a monofang type locking protrusion 530. In other words, a single docking mechanism 520 may be used. The single docking mechanism 520 may incorporate both a single locking protrusion 530 and one or more components of one or more electrical protrusions (e.g., the electrical protrusions 108 shown in FIGS. 1 and 2) into the single docking mechanism 520 to be inserted into a single locking receptacle 540 that includes one or more components of one or more electrical receptacles (e.g., electrical receptacles 109).

As shown, the docking mechanism 520 includes a plurality of locking mechanisms 590 and a plurality of undocking assist mechanisms 580. In other embodiments, a single locking mechanism 590 and/or a single undocking assist mechanism 580 may be used.

The locking mechanisms 590 and undocking assist mechanisms 580 are actuated by a pair of actuators 570. The actuators 570 may include one or more SMA wires 578, as shown. The SMA wires 578 may be attached to the locking mechanisms 590 via connectors 574. The undocking assist mechanisms 580 may be connected to the locking mechanisms 590 via lever arms 576. The lever arms 576 may pivot about pins 573, such that when the actuators 570 pull on the connectors 574, the locking mechanisms 590 move toward the top of the first portion 502 and the undocking assist mechanisms 590 move toward the bottom of the first portion 502. In this way, the locking mechanisms 590 may unlock the locking protrusion 530 from the locking receptacle 540 while the undocking assist mechanisms 580 push the locking protrusion 530 at least partially out of the locking receptacle 540.

Figure 6:
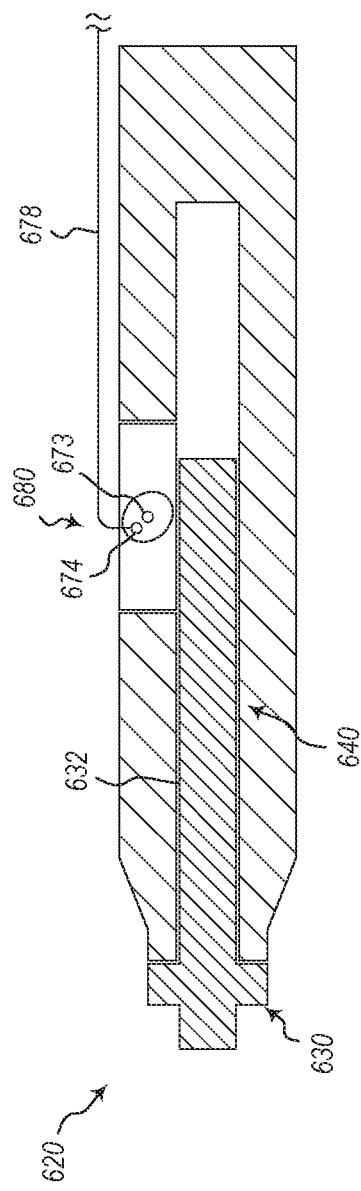
FIG. 6 is a side cutaway view of another embodiment of a docking mechanism.

FIG. 6 is a side cutaway view of another embodiment of a docking mechanism 620. The docking mechanism 620 may include a locking protrusion 630 and a locking receptacle 640. The locking receptacle 640 may be sized and configured to receive the locking protrusion 630. The docking mechanism 620 may include an undocking assist mechanism 680. The undocking assist mechanism 680 may be used in place of or in addition to any other undocking assist mechanism described herein.

The undocking assist mechanism 680 is shown as a cam device. The cam may pivot about a pin 673. The undocking assist mechanism 680 may be actuated by an actuator, such as SMA wire 678. The SMA wire 678 may connect to a connector 674 on the cam. As the SMA wire 678 contracts, the undocking assist mechanism 680 rotates about the pin 673 and pushes against the front surface 632 of the locking protrusion 630. As the undocking assist mechanism 680 continues to rotate, the friction against the front surface 632 of the locking protrusion 630 pushes the locking protrusion 630 at least partially out of the locking receptacle 640.

In some embodiments, the undocking assist mechanism 680 may also act as a lock. For example, as shown in FIG. 6, the cam may be biased to prevent the locking protrusion 630 from exiting the locking receptacle 640.

Figure 7:
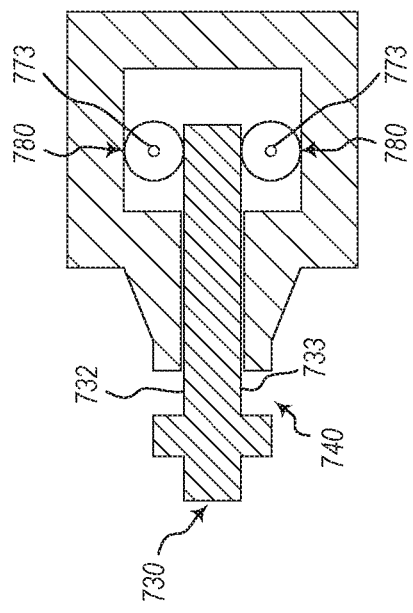
FIG. 7 is a side cutaway view of another embodiment of a docking mechanism.

FIG. 7 is a side cutaway view of another embodiment of a docking mechanism 720. The docking mechanism 720 may include a locking protrusion 730 and a locking receptacle 740. The locking receptacle 740 may be sized and configured to receive the locking protrusion 730. The docking mechanism 720 may include one or more undocking assist mechanism 780 and is shown with two undocking assist mechanisms 780. The undocking assist mechanism 780 may be used in place of or in addition to any other undocking assist mechanism described herein.

The undocking assist mechanisms 780 are shown as two wheels that pivot about two pins 773. The undocking assist mechanisms 780 may be formed from an elastic material such that when the locking protrusion 730 contacts the undocking assist mechanisms 780, the material compresses and allows the locking protrusion 730 to extend between the undocking assist mechanisms 780. In some embodiments, the undocking assist mechanisms 780 may lock the locking protrusion 730 within the locking receptacle 740, such that the locking protrusion 730 is held within the locking receptacle 740 until the undocking assist mechanisms 780 is actuated.

One or more of the undocking assist mechanisms 780 may be actuated by one or more actuators, such a motor, SMA wires, other actuators, or combinations thereof. As shown, the undocking assist mechanisms 780 rotates about the pin 773 based on a rotational input (e.g., motor, SMA wire, or other actuators). In some embodiments, one of the undocking assist mechanisms 780 may simply rotate about the pin 773 while the other undocking assist mechanism 780 is actuated.

As one or more of the undocking assist mechanisms 780 are actuated, the undocking assist mechanisms 780 push against the front surface 732 of the locking protrusion 730. As the undocking assist mechanism 780 continues to rotate, the friction against the front surface 732 of the locking protrusion 730 pushes the locking protrusion 730 at least partially out of the locking receptacle 740.

Figure 8:
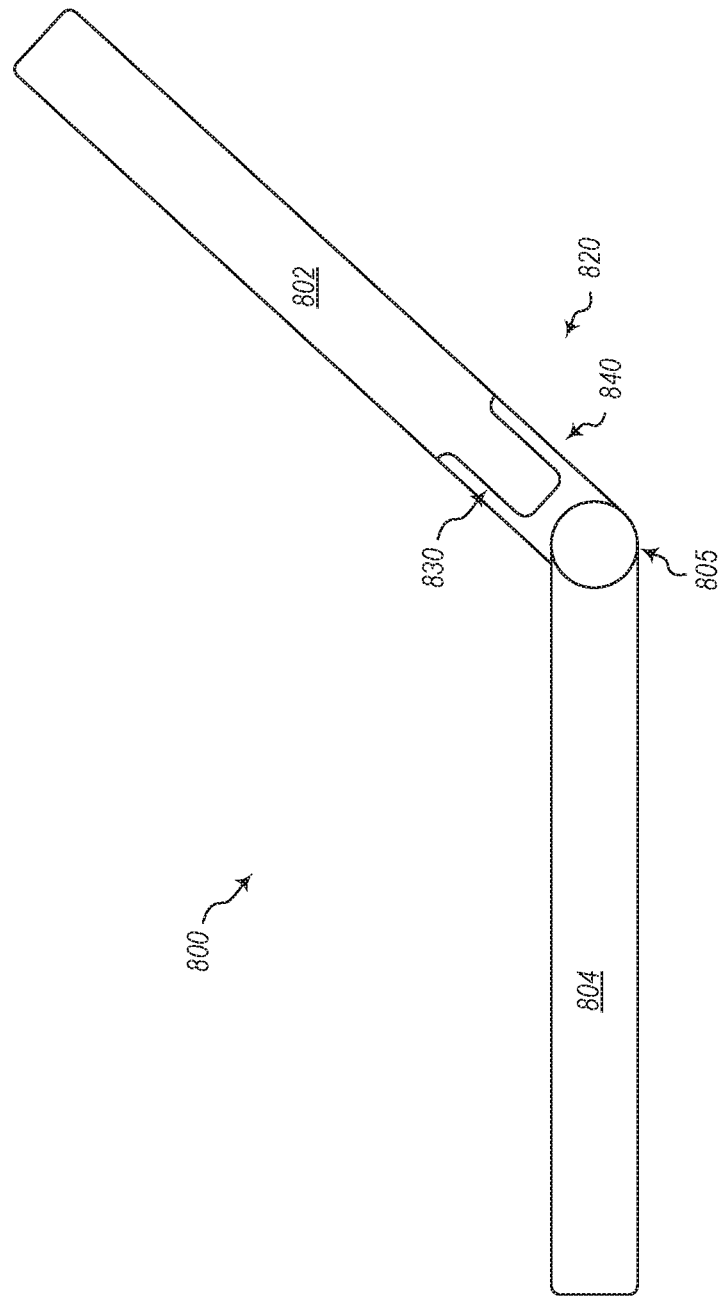
FIG. 8 is a side view of an embodiment of a computing device in a docked configuration.

Although locking protrusions have been generally described as being connected to a portion of a computing device, as shown in FIG. 8 with docking mechanism 820, the locking protrusion 830 may be an integral part of one of the portions of the computing device 800. For example, as shown, the locking protrusion 830 may be a portion of a first portion 802 of the computing device 800 and a locking receptacle 840 may be an integral portion of a second portion 804 of the computing device 800. As shown, the locking receptacle 840 may be integral with a hinge 805 of the computing device.

In one example, where the first portion 802 is a tablet computing device, the lower edge of the first portion may simply be a locking protrusion 830 as described herein that may be inserted into a locking receptacle 840. In another example, the second portion 804 may be a keyboard the entire top edge of which may be a locking protrusion that may be inserted into a locking receptacle 840.

Figure 9:
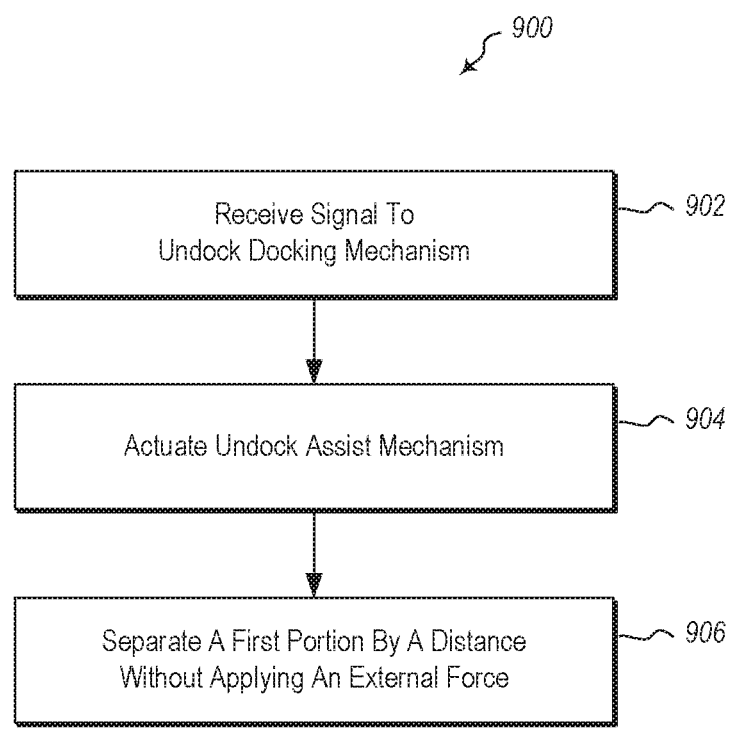
FIG. 9 is a flow diagram of a method for actuating a docking mechanism.

Referring to FIG. 9, a flow diagram of a method 900 for actuating a docking mechanism, the method 900 may include the act of receiving 902 a signal from a user to undock the docking mechanism. The signal may be sent by, for example, pressing an eject button (e.g., eject button 179), interacting with an input device (e.g., input device 111), other methods, or combinations thereof.

Once the signal is received 902, a processor may actuate 904 an undocking assist mechanism. For example, the processor may instruct an electronic actuator to apply current to a SMA wire (e.g., SMA wire 478).

The undocking assist mechanism may separate 906 a first portion of a computing device a distance from a second portion of the computing device without applying an external force. For example, the undocking assist mechanism may separate the first portion and the second portion of the computing device without the user directly applying force in the direction of separation. In other words, the undocking assist mechanism separates the two portions a distance before a user completely separates the two portions.

The method 900 may include actuating a locking mechanism to unlock a locking protrusion from a locking receptacle. In some embodiments, the locking mechanism may be actuated before the undocking assist mechanism is actuated. In other embodiments, the locking mechanism and the undocking assist mechanism may be simultaneously actuated. In further embodiments, the undocking assist mechanism may not be actuated until after the locking mechanism is unlocked.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" or "bottom" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device comprising:
    a first portion with a protrusion;
    a second portion separably connected to the first portion, the second portion having a receptacle with a width less than a width of the first portion;
    a processor located on one or more of the first portion and the second portion;
    an undocking assist mechanism located in the second portion and configured to separate the first portion from the second portion, the first portion is separated from the second portion using a surface of the undocking assist mechanism to push the protrusion at least partially out of the receptacle and away from the second portion, the protrusion is at least partially inserted into the receptacle in a docked configuration, at least a portion of the undocking assist mechanism slideable within the receptacle; and
    an actuator coupled with and configured to actuate the undocking assist mechanism.

2. The computing device of claim 1, wherein the protrusion is a portion of the first portion.

3. The computing device of claim 1, wherein the receptacle includes a locking mechanism.

4. The computing device of claim 1, an aperture of the receptacle is rounded on at least one edge.

5. The computing device of claim 1, wherein a front gap between a front surface of the protrusion and a front surface of the receptacle is less than 0.6 mm and a back gap between a back surface of the protrusion and a back surface of the receptacle is less than 0.6 mm.

6. The computing device of claim 1, wherein the protrusion is elongate.

7. The computing device of claim 1, wherein the protrusion is inserted into the receptacle between 2 mm and 12 mm.

8. The computing device of claim 1, wherein the undocking assist mechanism pushes the protrusion parallel to a longitudinal axis of the protrusion.

9. A computing device comprising:
a first portion;
a second portion separably connected to the first portion; and
a docking mechanism including a locking mechanism configured to lock the first portion to the second portion, the docking mechanism includes a locking receptacle connected to the first portion and a locking protrusion connected to the second portion, the locking receptacle and the locking protrusion cooperating to limit separation of the first portion from the second portion, the docking mechanism further including;
an actuator mechanically coupled to the locking mechanism and configured to unlock the first portion from the second portion, and
an undocking assist mechanism slides in the locking receptacle to separate the first portion from the second portion when the locking protrusion is at least partially inserted into the locking receptacle, the undocking assist mechanism abuts the locking protrusion in a docked configuration, in an undocked configuration, and between the docked configuration and undocked configuration.

10. The computing device of claim 9, wherein the locking mechanism further comprises a wedge locking mechanism.

11. The computing device of claim 10, wherein the wedge locking mechanism abuts the locking receptacle and the locking protrusion.

12. The computing device of claim 9, wherein the locking mechanism and the undocking assist mechanism are actuated by the actuator.

13. The computing device of claim 9, wherein the actuator is a first actuator, the locking mechanism being actuated by the first actuator and the undocking assist mechanism is actuated by a separate second actuator.

14. The computing device of claim 9, further comprising one or more magnets on the first portion and the second portion, wherein the undocking assist mechanism is configured to separate the first portion from the second portion by applying a force to the locking protrusion sufficient to overcome the force of the magnets.

15. The computing device of claim 9, wherein the actuator is a shape memory alloy (SMA) wire.

16. A method for at least partially separating a first portion from a second portion of a computing device, the method comprising:
receiving a request with a processor to eject the first portion from the second portion, the first portion having a locking protrusion, the second portion having a locking receptacle where the locking protrusion is at least partially inserted into the locking receptacle, the locking protrusion slideable within the locking receptacle;
actuating an undocking assist mechanism with the processor to apply an undocking force between the first portion from the second portion; and
separating the first portion from the second portion by a distance with the undocking force and without applying an external force.

17. The method of claim 16, further comprising actuating a locking mechanism to unlock the locking protrusion from the locking receptacle.

18. The method of claim 17, wherein the locking mechanism is actuated to unlock the locking protrusion from the locking receptacle before the undocking assist mechanism is actuated to separate the first portion from the second portion.

19. The method of claim 18, further comprising receiving a request to unlock the first portion from the second portion.

20. The method of claim 19, wherein the first portion is not separated from the second portion for a period of time after the locking mechanism is actuated to unlock the locking protrusion from the locking receptacle.

21. The method of claim 16, wherein separating the first portion from the second portion by a distance without applying an external force indicates to a user that the first portion may be completely separated by the user.

* * * * *